United States Patent [19]
Wang et al.

[11] Patent Number: 5,912,076
[45] Date of Patent: Jun. 15, 1999

[54] BLENDS OF POLYETHYLENE AND PEO HAVING INVERSE PHASE MORPHOLOGY AND METHOD OF MAKING THE BLENDS

[75] Inventors: James Hongxue Wang; David Michael Schertz, both of Appleton, Wis.

[73] Assignee: Kimberly-Clark Worldwide, Inc., Neenah, Wis.

[21] Appl. No.: 08/855,324

[22] Filed: May 13, 1997

Related U.S. Application Data

[60] Provisional application No. 60/034,235, Dec. 31, 1996.

[51] Int. Cl.$^6$ .............. C08L 23/02; C08L 51/06
[52] U.S. Cl. .............. 428/338; 428/339; 525/64; 525/187
[58] Field of Search .............. 525/64, 187; 428/338, 428/339

[56] References Cited

U.S. PATENT DOCUMENTS

| | | | |
|---|---|---|---|
| 3,323,978 | 6/1967 | Rasmussen | 161/169 |
| 3,539,666 | 11/1970 | Schirmer | 264/51 |
| 3,717,541 | 2/1973 | Schirmer | 161/169 |
| 3,833,708 | 9/1974 | Miller et al. | 264/344 |
| 3,935,141 | 1/1976 | Potts et al. | 260/23 H |
| 3,954,928 | 5/1976 | Omori et al. | 264/51 |
| 4,018,729 | 4/1977 | Faucher et al. | 260/17 R |
| 4,021,509 | 5/1977 | Murayama et al. | 260/880 R |
| 4,080,405 | 3/1978 | Agouri et al. | 260/878 R |
| 4,186,233 | 1/1980 | Krajewski et al. | 428/213 |
| 4,868,222 | 9/1989 | Chau et al. | 521/61 |
| 5,095,619 | 3/1992 | Davis et al. | 30/41 |
| 5,300,574 | 4/1994 | Bacskai | 525/181 |
| 5,367,003 | 11/1994 | Petcavich | 523/124 |
| 5,369,168 | 11/1994 | Famili et al. | 525/57 |
| 5,391,423 | 2/1995 | Wnuk et al. | 428/217 |
| 5,395,308 | 3/1995 | Fox et al. | 604/15 |
| 5,415,905 | 5/1995 | Middlesworth et al. | 528/35.7 |
| 5,417,679 | 5/1995 | Toms et al. | 604/370 |
| 5,429,874 | 7/1995 | VanPutte | 428/522 |
| 5,446,100 | 8/1995 | Durrance et al. | 525/221 |
| 5,468,259 | 11/1995 | Sheth et al. | 8/497 |
| 5,489,470 | 2/1996 | Noda | 428/286 |
| 5,498,692 | 3/1996 | Noda | 528/361 |
| 5,498,785 | 3/1996 | Wang et al. | 525/371 |
| 5,509,913 | 4/1996 | Yeo | 604/364 |
| 5,532,066 | 7/1996 | Latiolais et al. | 428/483 |
| 5,540,663 | 7/1996 | Kroner et al. | 428/221 |
| 5,549,791 | 8/1996 | Herron et al. | 162/157.6 |

FOREIGN PATENT DOCUMENTS

| | | | |
|---|---|---|---|
| A-52355/93 | 3/1994 | Australia | C08L 71/02 |
| 0 184 440 A2 | 6/1986 | European Pat. Off. | B26B 21/24 |
| 0 473 091 A3 | 3/1992 | European Pat. Off. | B29D 7/01 |
| 0 488 119 A3 | 6/1992 | European Pat. Off. | C08L 101/00 |
| 0 507 561 A1 | 10/1992 | European Pat. Off. | C08G 81/02 |
| 0 640 650 A1 | 3/1995 | European Pat. Off. | C08L 23/16 |
| 49-126742 | 12/1974 | Japan . | |
| 61-272217 | 12/1986 | Japan | C08F 255/02 |
| 1-246411 | 10/1989 | Japan | D01F 1/10 |
| 2 295 553 | 6/1996 | United Kingdom | A61F 13/15 |
| WO 94/00163 | 1/1994 | WIPO | A61L 15/24 |
| WO 94/00293 | 1/1994 | WIPO | B32B 27/08 |
| WO 95/11929 | 5/1995 | WIPO | C08F 8/00 |
| WO 95/20614 | 8/1995 | WIPO | C08G 63/08 |
| WO 95/20615 | 8/1995 | WIPO | C08G 63/08 |
| WO 95/20621 | 8/1995 | WIPO | C08J 5/18 |
| WO 95/23249 | 8/1995 | WIPO | D01D 5/098 |
| WO 95/23250 | 8/1995 | WIPO | D01D 5/40 |
| WO 96/21057 | 7/1996 | WIPO | D04H 1/42 |
| WO 96/21475 | 7/1996 | WIPO | A61L 15/30 |

OTHER PUBLICATIONS

Bartczak, Z. and A. Galeski, "Changes in Interface Shape During Crystallization in Two–Component Polymer Systems," *Polymer*, 1986, vol. 27, Apr., pp. 544–548.

Mortensen, Kell, "Phase Behavior of Poly(propylene Oxide)–Poly(ethylene oxide)–Poly(propylene oxide) Triblock Copolymer Melt and Aqueous Solutions," *Macromolecules*, vol. 27, No. 20, 1994, pp. 5654–5666.

Song, Z. and W. E. Baker, "Melt Grafting of T–Butylaminoethyl Methacrylate Onto Polyethylene," *Polymer*, 1992, vol. 33, No. 15, pp. 3266–3273.

Tang, Tao and Baotong Huang, "Compatibilization of Polypropylene/Poly (Ethylene Oxide) Blends and Crystallization Behavior of the Blends," *Journal of Polymer Science: Part B: Polymer Physics*, vol. 32, (1994), pp. 1991–1998.

Sawyer, Linda C. and David T. Grubb, *Polymer Microscopy*, Chapman & Hall, London, 1987, p. 25.

*Primary Examiner*—Patricia A. Short
*Attorney, Agent, or Firm*—Jones & Askew, LLP

[57] ABSTRACT

A thermoplastic film comprises a polyolefin, such as polyethylene, as a major constituent, poly(ethylene oxide) as a minor constituent and has a total of from about 0.1 weight percent to about 30 weight percent of monomer grafted to the polyolefin and the poly(ethylene oxide). The film exhibits an inverse phase morphology so that the poly(ethylene oxide) forms a continuous phase and the polyolefin forms a dispersed or discontinuous phase in the film. Desirably, the film can be used in disposable personal hygiene articles.

20 Claims, 2 Drawing Sheets

BLENDS OF POLYETHYLENE AND PEO HAVING INVERSE PHASE MORPHOLOGY AND METHOD OF MAKING THE BLENDS

The application claims priority from the U.S. Provisional Application 60/034,235, filed Dec. 31, 1996, the disclosure of which is incorporated herein by reference.

FIELD OF THE INVENTION

The present invention relates to a compositional thermoplastic film comprising polyethylene and poly(ethylene oxide) which exhibits an inverse phase morphology.

BACKGROUND OF THE INVENTION

There are a wide variety of disposable plastic articles of manufacture in use today. Because of their low cost and convenience, they are very popular and have a high consumer demand. However, many of these articles are not degradable or easily disposed of. Consequently, they have caused and continue to cause a waste disposal problem.

Personal care products, such as diapers, sanitary napkins, adult incontinence garments, and the like are generally constructed from a number of different components and materials. Such articles typically have some portion, usually the backing layer, liner, or baffle that is composed of a film constructed from a liquid repellent material. This repellent material is appropriately constructed to minimize or prevent the exuding of the absorbed liquid from the article and to obtain greater utilization of the absorbent capacity of the product. The liquid repellent film commonly used includes plastic materials such as polyethylene films and the like.

Although such products are relatively inexpensive, sanitary and easy to use, disposal of a product once soiled is not without its problems. An ideal disposal method for such products would be to use municipal sewage treatment and private residential septic systems. Products suited for disposal in sewage systems can be flushed down a convenient toilet and are termed "flushable." While flushing such articles would be convenient, the liquid repellent material which normally does not disintegrate in water tends to plug toilets and sewer pipes. It therefore becomes necessary, although undesirable, to separate the barrier film material from the absorbent article prior to flushing.

In an attempt to overcome the flushability problem of a water resistant film the prior art has modified the water resistant polymer. One of the more useful ways of modifying polymers involves blending them with other polymers of different structures and properties. In a few cases, polymer blend combinations are thermodynamically miscible and exhibit mechanical compatibility. However, by far a greater number of blends are phase separated and generally exhibit poor mechanical compatibility. Phase separated blends can in some cases exhibit mechanical compatibility where the polymer compositions are similar, for example, polyolefin blended with other similar polyolefins, or where interfacial agents are added to improve the compatibility at the interface between the constituents of the polymer blend.

Polymer blends of polyolefins and poly(ethylene oxide) are melt processible but exhibit very poor mechanical compatibility. This poor mechanical compatibility is particularly manifested in blends having greater than 50 weight percent of polyolefin. Generally the film is not affected by water since typically the majority phase, i.e. polyolefin, will surround and encapsulate the minority phase, i.e. the poly (ethylene oxide). The encapsulation of the poly(ethylene oxide) effectively prevents any degradability and/or flushability advantage that would be acquired by using poly (ethylene oxide).

In view of the problems of the prior art, it remains highly desirable to provide a blend having greater than about 50 weight percent of a polyolefin and poly(ethylene oxide) which would exhibit an inverse phase morphology. Films made from such a blend could be used for making barrier films for personal care products which would be flushable. The films could further be used for the manufacture of filter membranes.

SUMMARY OF THE INVENTION

Briefly, the present invention provides for a thermoplastic film comprising a polyolefin, poly(ethylene oxide) and an amount of monomer grafted onto the polyolefin and poly (ethylene oxide) so that the film exhibits an inverse phase morphology. As used herein "inverse phase morphology" means that the volumetric majority constituent, which normally would be expected to form the continuous phase in the film, is actually the dispersed phase. Correspondingly, the volumetric minority constituent forms the continuous phase in which the volumetric majority constituent is dispersed therein.

It is an object of the invention to provide a thermoplastic film having an inverse phase morphology. More specifically, it is an object of the invention to provide a thermoplastic film having from about 55 weight percent to about 85 weight percent of a polyolefin, from about 45 weight percent to about 15 weight percent of poly(ethylene oxide) and an amount of monomer grafted to the polyolefin and poly (ethylene oxide) such that the film exhibits an inverse phase morphology. As used herein the "weight percents" of polyolefin and poly(ethylene oxide) are determined using the total amount of polyolefin and poly(ethylene oxide) forming the thermoplastic composition without regard to the amount of monomer added.

DETAILED DESCRIPTION OF THE INVENTION

Figure 1:
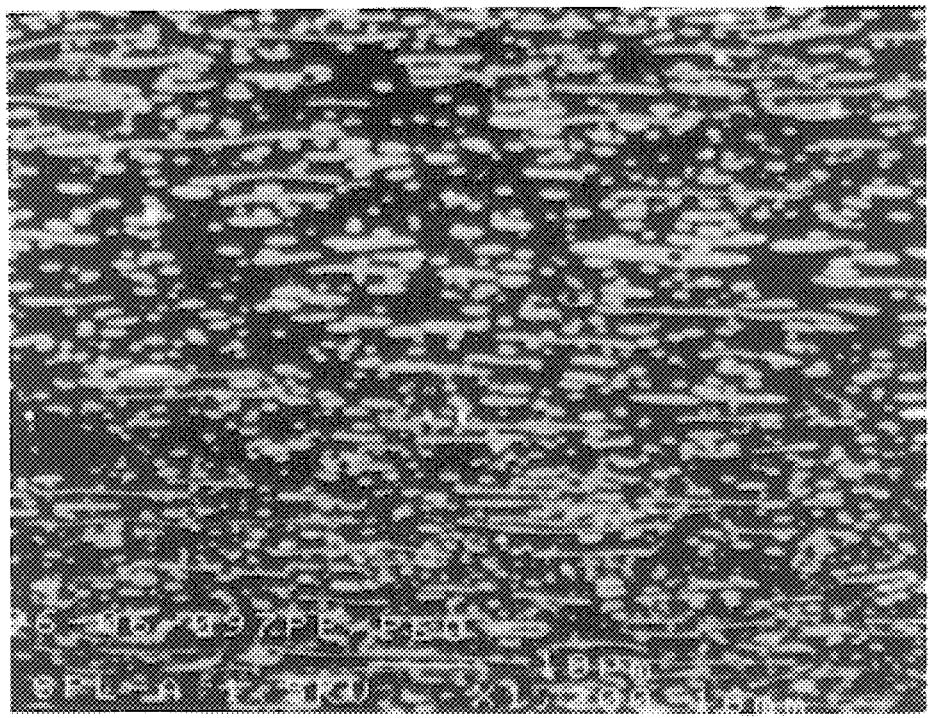
FIG. 1 is a scanning electron microscopic photomicrograph of a back-scattered electron image of a cross-sectional view of a 4 mil (0.004 inch) film having a composition of 60 weight percent polyethylene and 40 weight percent poly (ethylene oxide).

Although the present invention is described with reference to a thermoplastic film, one skilled in the art would understand the utility of the invention toward other thermoplastic articles that can be extruded or injection molded. The film composition of the present invention comprises from about 55 weight percent to about 85 weight percent of a polyolefin, from about 45 weight percent to about 15 weight percent of poly(ethylene oxide) and an amount of monomer grafted onto the polyolefin and poly(ethylene oxide) so that the film exhibits an inverse phase morphology. It has unexpectedly been discovered that this inverse phase morphology, where a hydrophilic moiety constitutes the continuous phase, can be achieved by a minority component of the film to greatly expand the water sensitivity and degradability of a film. Preferably, the blend has from about 60 weight percent to about 85 weight percent of polyethylene and from about 40 weight percent to about 15 weight percent of poly(ethylene oxide) with an effective amount of monomer grafted onto the polyolefin and poly(ethylene oxide) to render the thermoplastics phase inversion.

The saturated ethylene polymers useful in the practice of this invention are homopolymers or copolymers of ethylene and are essentially linear in structure. As used herein, the term "saturated" refers to polymers which are fully saturated, but also includes polymers containing up to about 5% unsaturation. The homopolymers of ethylene include those prepared under either low pressure, i.e., linear low density or high density polyethylene, or high pressure, i.e., branched or low density polyethylene. The high density polyethylenes are generally characterized by a density that is about equal to or greater than 0.94 grams per cubic centimeter (g/cc). Generally, the high density polyethylenes useful as the base resin in the present invention have a density ranging from about 0.94 g/cc to about 0.97 g/cc. The polyethylenes can have a melt index, as measured at 2.16 kg and 190° C., ranging from about 0.005 decigrams per minute (dg/min) to 100 dg/min. Desirably, the polyethylene has a melt index of 0.01 dg/min to about 50 dg/min and more desirably of 0.05 dg/min to about 25 dg/min. Alternatively, mixtures of polyethylene can be used as the base resin in producing the graft copolymer compositions, and such mixtures can have a melt index greater than 0.005 dg/min to less than about 100 dg/min.

The low density polyethylene has a density of less than 0.94 g/cc and are usually in the range of 0.91 g/cc to about 0.93 g/cc. The low density polyethylene has a melt index ranging from about 0.05 dg/min to about 100 dg/min and desirably from 0.05 dg/min to about 20 dg/min. Ultra low density polyethylene can be used in accordance with the present invention. Generally, ultra low density polyethylene has a density of less than 0.90 g/cc.

The above polyolefins can also be manufactured by using the well known multiple-site Ziegler-Natta catalysts or the more recent single-site metallocene catalysts. The metallocene catalyzed polyolefins have better controlled polymer microstructures than polyolefins manufactured using Ziegler-Natta catalysts, including narrower molecular weight distribution, well controlled chemical composition distribution, co-monomer sequence length distribution, and stereoregularity. Metallocene catalysts are known to polymerize propylene into atactic, isotactic, syndiotactic, isotactic-atactic steroblock copolymer.

Copolymers of ethylene which can be useful in the present invention may include copolymers of ethylene with one or more additional polymerizable, unsaturated monomers. Examples of such copolymers include, but are not limited to, copolymers of ethylene and alpha olefins (such as propylene, butene, hexene or octene) including linear low density polyethylene, copolymers of ethylene and vinyl esters of linear or branched carboxylic acids having 1–24 carbon atoms such as ethylene-vinyl acetate copolymers, and copolymers of ethylene and acrylic or methacrylic esters of linear, branched or cyclic alkanols having 1–28 carbon atoms. Examples of these latter copolymers include ethylene-alkyl (meth)acrylate copolymers, such as ethylene-methyl acrylate copolymers.

Poly(ethylene oxide) polymers suitable for the present invention can have a molecular weight ranging from 200,000 to 8,000,000 and preferably, range from about 200,000 to about 6,000,000. Poly(ethylene oxide) is available from Union Carbide Corporation under the trade name of POLYOX®. Typically, poly(ethylene oxide) is a dry free flowing white powder having a crystalline melting point in the order of about 65° C., above which poly(ethylene oxide) resin becomes thermoplastic and can be formed by molding, extrusion and other methods known in the art.

The polyolefin and poly(ethylene oxide) comprising the film have grafted thereto an effective amount of monomer, polyethylene glycol ethyl ether methacrylate (available from Aldrich Chemical Company, Milwaukee, Wis.), which, unexpectedly, produces in the film an inverse phase morphology. Referring to FIG. 1, one skilled in the art would expect for the polyethylene, as the major constituent, to form the continuous phase where the poly(ethylene oxide) is distributed therein as the discontinuous phase. However, referring to FIGS. 2–4, a film of the present invention has the poly(ethylene oxide) as the continuous phase with the polyethylene distributed as the discontinuous phase notwithstanding that there is a greater amount of polyethylene. The amount of monomer grafted onto the polyolefin and poly(ethylene oxide) is a total of from about 0.1 weight percent to about 30 weight percent, based on the weight of the polyolefin and poly(ethylene oxide). Desirably, the polyolefin and poly(ethylene oxide) have a total of from about 1 weight percent to about 20 weight percent of the monomer grafted thereto. More desirably, the polyolefin and poly(ethylene oxide) have a total of from about 1 weight percent to about 10 weight percent of the monomer grafted thereto.

To prepare the grafted polyethylene and poly(ethylene oxide) constituents of the film of the invention, the polyolefin and poly(ethylene oxide) are reacted with the monomer in the presence of a free radical initiator. The initiator serves to initiate free radical grafting of the monomer. The method of grafting the polymer blends includes melt blending the desired weight ratios of a mixture of the polyolefin, poly(ethylene oxide), the monomer and a free radical initiator in an extruder and at a reaction temperature where the polyolefin and poly(ethylene oxide) are converted to a molten state. Accordingly, a preferred method includes adding the polyolefin, poly(ethylene oxide), monomer and free radical initiator simultaneously to the extruder before the polymer constituents, i.e., the polyolefin and poly(ethylene oxide) have been melted. Desirably, the melt extruder used for melt blending can introduce various constituents into the blend at different locations along the screw length. For example, the free radical initiator, cross-linking agents, or other reactive additives can be injected into the blend before or after one or more of the polymer constituents is melted or thoroughly mixed. More preferably, the polyolefin and poly(ethylene oxide) are added at the beginning of the extruder. After melting, the monomer is added to melted polymers and further down the extruder barrel, the free radical initiator is fed to the melt blend. The method is described in greater detail in U.S. Pat. No. 5,700,872 filed on Dec. 31, 1996 and entitled "BLENDS OF POLYOLEFIN AND POLY(ETHYLENE OXIDE) AND PROCESS FOR MAKING THE BLENDS", the entire disclosure of which is incorporated herein by reference.

The free radical initiators which can be used to graft the monomer onto the polyolefin include acyl peroxides such as benzoyl peroxide; dialkyl; diaryl; or aralkyl peroxides such as di-t-butyl peroxide; dicumyl peroxide; cumyl butyl peroxide; 1,1-di-t-butyl peroxy-3,5,5-trimethylcyclohexane; 2,5-dimethyl-2,5-di(t-butylperoxy)hexane; 2,5-dimethyl-2,5-bis(t-butylperoxy)hexyne-3 and bis(a-t-butyl peroxyisopropylbenzene); peroxyesters such as t-butyl peroxypivalate; t-butyl peroctoate; t-butyl perbenzoate; 2,5-dimethylhexyl-2,5-di(perbenzoate); t-butyl di(perphthalate); dialkyl peroxymonocarbonates and peroxydicarbonates; hydroperoxides such as t-butyl hydroperoxide, p-methane hydroperoxide, pinane hydroperoxide and cumene hydroperoxide and ketone peroxides such as cyclohexanone peroxide and methyl ethyl ketone peroxide. Azo compounds such as azobisisobutyronitrile may also be used.

The amount of free radical initiator added to the extruder should be an amount sufficient to graft from about 1 percent to 100 percent of the monomer onto the polyolefin and poly(ethylene oxide). This ranges from about 0.1 weight percent to about 10 weight percent of initiator, and preferably, from about 0.1 weight percent to about 5 weight percent wherein all such ranges are based on the amount of monomer added to the melt blend.

Characteristic of the thermoplastic film of the invention, the film when viewed using a scanning electron microscope and using back-scattered electron detector images shows that the poly(ethylene oxide) forms the continuous phase wherein the polyolefin is in a discontinuous phase, that is, dispersed throughout the poly(ethylene oxide) phase. Back-scattered electron detector imaging produces an image wherein the higher average atomic number of the constituent produces a higher intensity of back-scattered electrons, which appear brighter on the photographic image. A constituent having a lower atomic number produces a lower intensity of back-scattered electrons, which appear as a darker image on the photograph. Back-scattered electron microscope imaging is described in greater detail in Linda C. Sawyer and David T. Grubb, *Polymer Microscopy*, Chapman & Hall, London, 1987, p. 25. Desirably, the polyolefin portions of the thermoplastic film have an average cross-sectional diameter ranging from about 0.1 microns to about 50 microns, preferably from about 0.5 microns to about 30 microns and more preferably from about 0.5 microns to about 25 microns. Such "polyolefin portions" can be solidified pockets of polyolefin, fibers or combinations thereof.

The present invention is illustrated in greater detail by the specific examples presented below. It is to be understood that these examples are illustrative embodiments and are not intended to be limiting of the invention, but rather are to be construed broadly within the scope and content of the appended claims.

COMPARATIVE EXAMPLE

A 60/40 weight percent resin blend of low density polyethylene (PE) and poly(ethylene oxide) (PEO) was melt blended using an extruder. The PE had a melt index of 1.9 decigrams per minute (dg/min) and a density of 0.917 grams per cubic centimeter (g/cc) (Dow 5031; available from Dow Chemical Company, Midland, Mich.). The PEO had a molecular weight of 200,000 g/mol (POLYOX® WSRN-80; available from Union Carbide Corp.). The extruder used for making the blend was a Werner & Pfleiderer ZSK-30 extruder (available from Werner & Pfleiderer Corporation, Ramsey, N.J.). The resin blend was fed to the extruder at a rate of 34 lb/hr. The extruder had a pair of co-rotating screws arranged in parallel. The center distance between the two shafts was 26.2 mm. The nominal screw diameter was 30 mm. The actual outer screw diameter was 30 mm. The inner screw diameter was 21.3 mm. The thread depth was 4.7 mm. The extruder had 14 processing barrels, with 13 heated barrels divided into 7 heating zones. The overall processing length was 1340 mm. The seven heating zones were all set at 180 degrees Centigrade (°C.). The screw speed was set at 300 rpm.

All films of the melt blends in the Comparative Example and Examples 1–9 were made using a Haake counter-rotating twin screw extruder (available from Haake, 53 West Century Road, Paramus, N.J., 07652) equipped with a four inch slit die. The extruder had a length of 300 millimeters. The conical screws had 30 millimeters diameter at the feed port and a diameter of 20 millimeters at the die. The extruder had four heating zones set at 170, 180, 180 and 190° C. The screw speed was 30 rpm. A chilled wind-up roll was used to collect the film. The chilled roll was operated at a speed sufficient to form a film having a thickness of about 4 mils (about 0.004 of an inch) and was maintained at a temperature of 15–20° C.

Referring to FIG. 1, the polyethylene formed the continuous phase and the poly(ethylene oxide) formed the discontinuous phase.

EXAMPLES 1–3

In accordance with the invention, a 60/40 weight percent resin blend of low density polyethylene and poly(ethylene oxide), as described above in the Comparative Example, was fed to the ZSK-30 extruder at a rate of 34 lb/hr. The seven heating zones were all set at 180° C. The screw speed was 300 rpm. At barrel 4 of the extruder, a monomer, poly (ethylene glycol) ethyl ether methacrylate (PEG-MA; available from Aldrich Chemical Company, Milwaukee, Wis.), was added at the specified rate. At barrel 5 of the extruder, a free radical initiator (2,5-dimethyl-2,5-di(t-butylperoxy) hexane, supplied by Atochem, 2000 Market St., Philadelphia, Pa. under the tradename Lupersol 101) was added at the specified rate.

For Example 1, the PEG-MA feed rate was 1.0 lb/hr and the initiator rate was 0.068 lb/hr.

For Example 2, the PEG-MA feed rate was 1.9 lb/hr and the initiator rate was 0.068 lb/hr.

For Example 3, the PEG-MA feed rate was 3.1 lb/hr and the initiator rate was 0.17 lb/hr.

Figure 2:
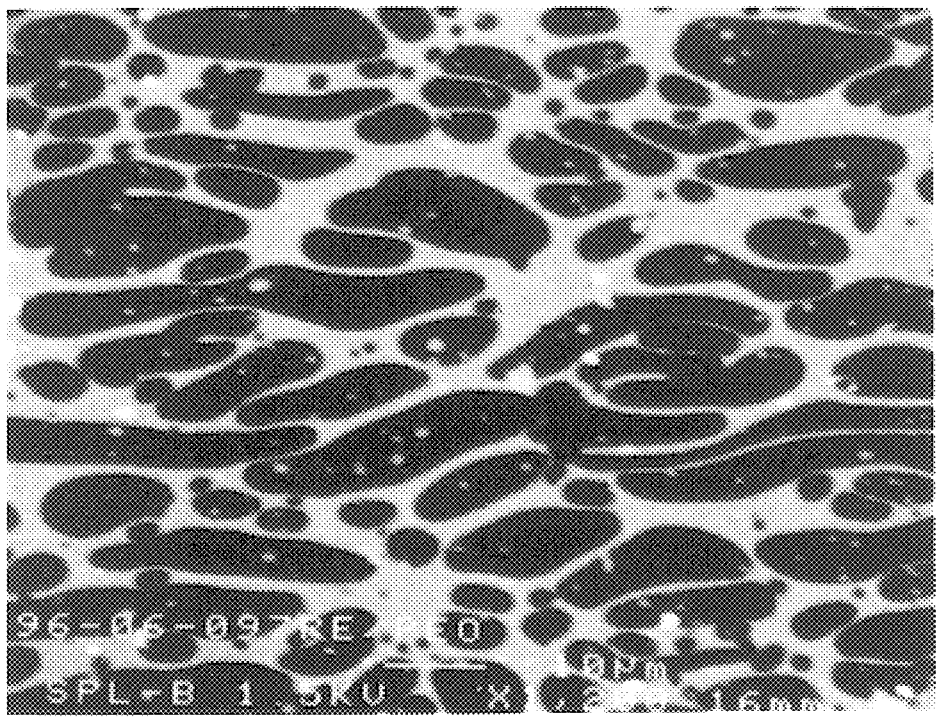
FIG. 2 is a scanning electron microscopic photomicrograph of a back-scattered electron image of a cross-sectional view of a 4 mil film having a composition of 60 weight percent polyethylene, 40 weight percent poly(ethylene oxide) with about 3 weight percent of a monomer added to the polyethylene and poly(ethylene oxide).
Figure 3:
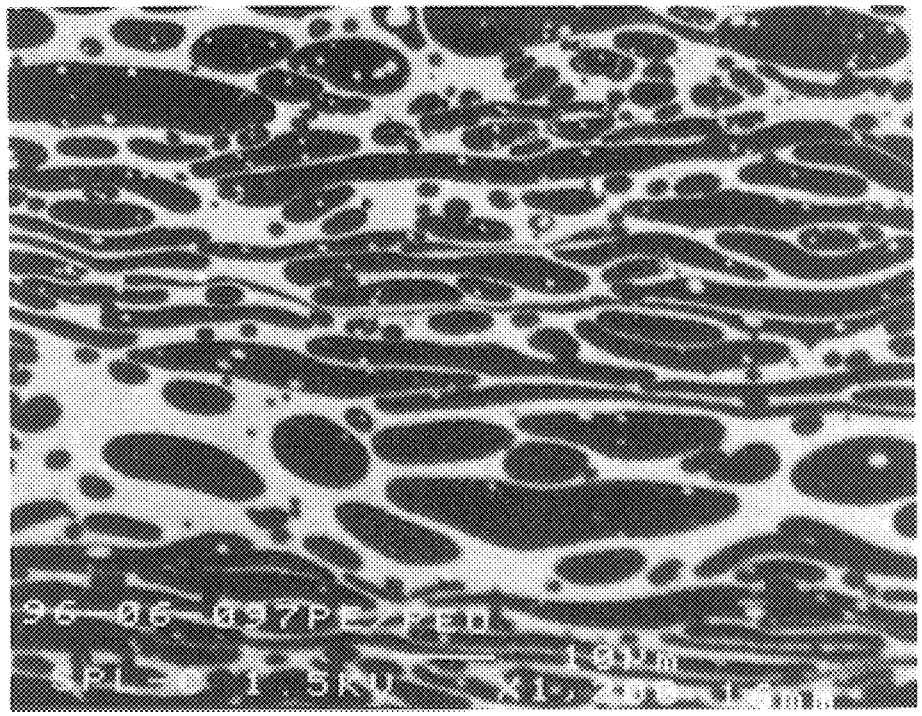
FIG. 3 is a scanning electron microscopic photomicrograph of a back-scattered electron image of a cross-sectional view of a 4 mil film having a composition of 60 weight percent polyethylene, 40 weight percent poly(ethylene oxide) and about 5.5 weight percent of a monomer added to the polyethylene and poly(ethylene oxide).
Figure 4:
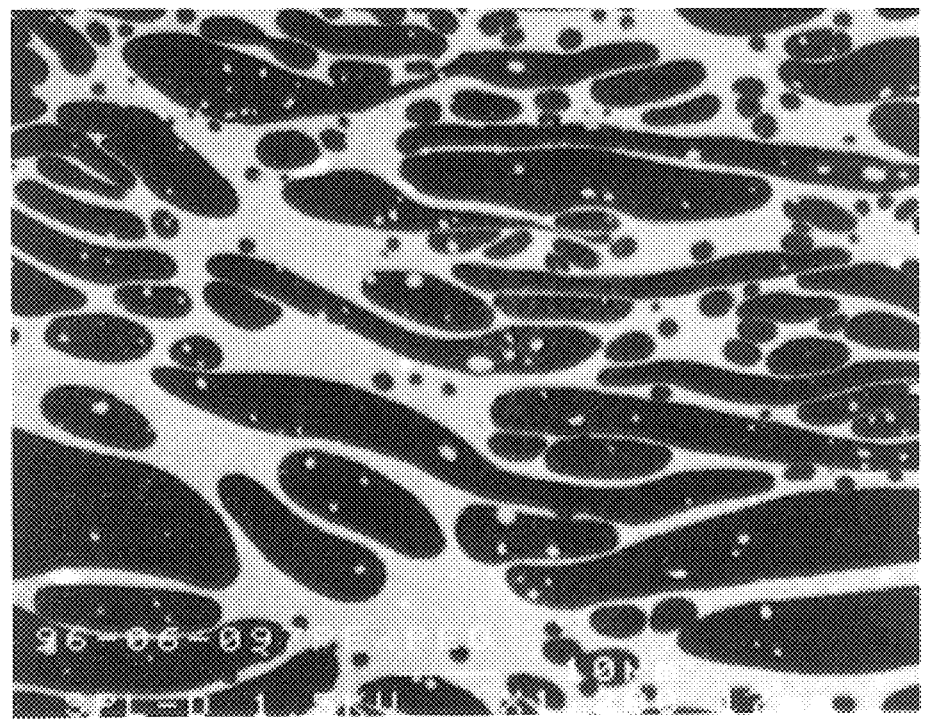
FIG. 4 is a scanning electron microscopic photomicrograph of a back-scattered electron image of a cross-sectional view of a 4 mil film having a composition of 60 weight percent polyethylene, 40 weight percent poly(ethylene oxide) and about 9 weight percent of a monomer added to the polyethylene and poly(ethylene oxide).

Referring to FIGS. 2–4, the thermoplastic film of the invention exhibited an inverse phase morphology having the poly(ethylene oxide) as the continuous phase and the polyethylene as the discontinuous phase.

EXAMPLE 4

A 60/40 weight percent resin blend of low density polyethylene (Dow 5031) and poly(ethylene oxide) having a molecular weight of 100,000 g/mol (POLYOX® WSRN-10) was fed to the ZSK-30 extruder at a rate of 35 lb/hr. The seven heating zones were all set at 180° C. The screw speed was 300 rpm. A film of the melt blended resin exhibited an inverse phase morphology having the poly(ethylene oxide) as the continuous phase and the polyethylene as the discontinuous phase.

EXAMPLES 5–9

A resin blend having the specified ratio of low density polyethylene (Dow 5031) and poly(ethylene oxide)

(POLYOX® WSRN-80) was fed to a Haake extruder at 5.0 lb/hr. The Haake extruder was similar to that described above in the Comparative Example except the extruder included a two-hole strand die instead of the four inch slit die. Simultaneously with the polymer feed to the extruder, specified amounts of the monomer, PEG-MA, and free radical initiator (Lupersol 101) were added at the feed throat. The extruder had four heating zones set at 170, 180, 180, and 190° C. The screw speed of the extruder was 150 rpm. The strands were cooled in air and pelletized.

For Example 5 the blend was 60/40 PE/PEO, the PEG-MA feed rate was 0.50 lb/hr and the initiator rate was 0.025 lb/hr.

For Example 6 the blend was 65/35 PE/PEO, the PEG-MA feed rate was 0.50 lb/hr and the initiator rate was 0.025 lb/hr.

For Example 7 the blend was 70/30 PE/PEO, the PEG-MA feed rate was 0.50 lb/hr and the initiator rate was 0.025 lb/hr.

For Example 8 the blend was 75/25 PE/PEO, the PEG-MA feed rate was 0.50 lb/hr and the initiator rate was 0.025 lb/hr.

For Example 9 the blend was 80/20 PE/PEO, the PEG-MA feed rate was 0.50 lb/hr and the initiator rate was 0.025 lb/hr.

The films of Examples 5–9 exhibited an inverse phase morphology having the poly(ethylene oxide) as the continuous phase and the polyethylene as the discontinuous phase.

For Example 5, the amount of monomer grafted onto the poly(ethylene oxide) was determined, by proton NMR spectroscopy in deuterated water, to be 9.52 weight percent based on the amount of poly(ethylene oxide) in the blend. The amount of unreacted monomer was determined, by proton nuclear magnetic resonance (NMR) spectroscopy in deuterated water, to be 2.02 weight percent based on the amount of polyethylene and poly(ethylene oxide) in the blend. The amount of monomer grafted onto the polyethylene was determined to be 0.51 weight percent by Fourier-Transform Infrared (FT-IR) and oxygen content analysis as described in copending U.S. patent application Ser. No. 08/733,410 filed Oct. 18, 1996 the entire disclosure of which is incorporated herein by reference.

While the invention has been described with reference to a preferred embodiment, those skilled in the art will appreciate that various substitutions, omissions, changes and modifications may be made without departing from the spirit hereof. Accordingly, it is intended that the foregoing examples be deemed merely exemplary of the present invention an not be deemed a limitation thereof.

We claim:

1. A thermoplastic article comprising:
   a) from 55 weight percent to about 85 weight % of a polyolefin;
   b) from about 45 weight % to about 15 weight % of poly(ethylene oxide); and
   c) from about 0.1 weight % to about 30 weight percent, based on the total amount of the polyolefin and the poly(ethylene oxide), of polyethylene glycol ethyl ether methacrylate grafted to said polyolefin and said poly (ethylene oxide); whereby said article exhibits an inverse phase morphology so that said poly(ethylene oxide) forms a continuous phase and said polyolefin forms a dispersed or discontinuous phase in said thermoplastic article.

2. The thermoplastic article of claim 1 comprising from 60 weight percent to about 85 weight percent of said polyolefin and from about 40 weight percent to about 15 weight percent of said poly(ethylene oxide).

3. The thermoplastic article of claim 1 wherein said polyolefin is polyethylene.

4. The thermoplastic article of claim 1 wherein said polyolefin is polypropylene.

5. The thermoplastic article of claim 1 wherein a total of about 1 weight percent to about 20 weight percent, based on the total amount of polyolefin and poly(ethylene oxide), of said monomer is grafted onto said polyolefin and said poly(ethylene oxide).

6. The thermoplastic article of claim 1 wherein a total of about 1 weight percent to about 10 weight percent, based on the total amount of polyolefin and poly(ethylene oxide), of said monomer is grafted onto said polyolefin and said poly(ethylene oxide).

7. The thermoplastic article of claim 1 wherein said article is a film.

8. The thermoplastic film of claim 7 wherein the polyolefin in the dispersed phase has an average cross-sectional diameter of from about 0.1 microns to about 50 microns.

9. The thermoplastic film of claim 7 wherein the polyolefin in the dispersed phase has an average cross-sectional diameter of from about 0.5 microns to about 30 microns.

10. The thermoplastic film of claim 7 wherein the polyolefin in the dispersed phase has an average cross-sectional diameter of from about 0.5 microns to about 25 microns.

11. A thermoplastic film comprising:
   a) from 55 weight percent to about 85 weight percent of polyethylene;
   b) from about 45 weight percent to about 15 weight percent poly(ethylene oxide); and
   c) from about 0.1 weight percent to about 30 weight percent, based on the total amount of polyolefin and poly(ethylene oxide), of polyethylene glycol ethyl ether methacrylate grafted to said polyethylene and said poly(ethylene oxide) whereby said film exhibits an inverse phase morphology so that said poly(ethylene oxide) forms a continuous phase and said polyethylene forms a dispersed or discontinuous phase in said thermoplastic film.

12. The thermoplastic film of claim 11 comprising from 60 weight percent to about 85 weight percent of said polyolefin and from about 40 weight percent to about 15 weight percent of said poly(ethylene oxide).

13. The thermoplastic film of claim 11, wherein a total of about 0.1 weight percent to about 20 weight percent, based on the total weight of polyethylene and poly(ethylene oxide), of said polyethylene glycol ethyl ether methacrylate is grafted onto said polyethylene and said poly(ethylene oxide).

14. The thermoplastic film of claim 11, wherein a total of about 0.1 weight percent to about 10 weight percent, based on the total weight of polyethylene and poly(ethylene oxide), of said polyethylene glycol ethyl ether methacrylate is grafted onto said polyethylene and said poly(ethylene oxide).

15. The thermoplastic film of claim 11 wherein the polyethylene in the dispersed phase has an average cross-sectional diameter of from about 0.1 microns to about 50 microns.

16. A thermoplastic article comprising:
   a) a polyolefin;
   b) poly(ethylene oxide); and
   c) from about 0.1 weight percent to about 30 weight percent, based on the total amount of polyolefin and poly(ethylene oxide), of polyethylene glycol ethyl ether methacrylate grafted onto said polyolefin and said poly(ethylene oxide); whereby said article exhibits an inverse phase morphology so that said poly(ethylene oxide) forms a continuous phase and said polyolefin forms a dispersed or discontinuous phase in said thermoplastic article.

17. The thermoplastic article of claim 16, wherein the article comprises greater than about 50 weight percent of said polyolefin and less than about 50 weight percent of said poly(ethylene oxide).

18. The thermoplastic article of claim 16, wherein the article comprises from 55 weight percent to about 85 weight percent of said polyolefin and from about 45 weight % to about 15 weight percent of said poly(ethylene oxide).

19. The thermoplastic article of claim 16, wherein the article comprises from 60 weight percent to about 85 weight percent of said polyolefin and from about 40 weight percent to about 15 weight percent of said poly(ethylene oxide).

20. The thermoplastic article of claim 16, wherein said polyolefin is polyethylene.

* * * * *